(12) United States Patent
Pan et al.

(10) Patent No.: US 10,209,818 B2
(45) Date of Patent: Feb. 19, 2019

(54) DISPLAY PANEL AND DRIVE METHOD THEREOF AS WELL AS DISPLAY APPARATUS

(71) Applicants: Xiamen Tianma Micro-Electronics Co., Ltd., Xiamen (CN); Tianma Micro-Electronics Co., Ltd., Shenzhen (CN)

(72) Inventors: Chaohuang Pan, Xiamen (CN); Ting Zhou, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 29 days.

(21) Appl. No.: 15/380,980

(22) Filed: Dec. 15, 2016

(65) Prior Publication Data
US 2017/0097730 A1  Apr. 6, 2017

(30) Foreign Application Priority Data

Aug. 11, 2016  (CN) .......................... 2016 1 0654966

(51) Int. Cl.
*G06F 3/041* (2006.01)
*G02F 1/1333* (2006.01)
(Continued)

(52) U.S. Cl.
CPC ........ *G06F 3/0416* (2013.01); *G02F 1/13338* (2013.01); *G02F 1/13394* (2013.01);
(Continued)

(58) Field of Classification Search
CPC .......... G02F 1/133308; G02F 1/13338; G02F 1/133512; G02F 1/13394; G02F 1/134309;
(Continued)

(56) References Cited

U.S. PATENT DOCUMENTS

2016/0349907 A1* 12/2016 Kobayashi ........... G09G 3/3655
2017/0068368 A1*  3/2017 Hsiao ................... G06F 3/0416
(Continued)

FOREIGN PATENT DOCUMENTS

| CN | 101930132 A | 12/2010 |
| CN | 104992627 A | 10/2015 |
| CN | 205038623 U | 2/2016 |

OTHER PUBLICATIONS

CN First Office Action dated Oct. 31, 2018 in the corresponding Chinese application(application No. 201610654966.6).

*Primary Examiner* — Lisa S Landis
(74) *Attorney, Agent, or Firm* — Kilpatrick Townsend & Stockton LLP

(57) ABSTRACT

A display panel is disclosed. The display panel can include: a first substrate; a second substrate, arranged opposite to the first substrate; a first pressure-sensitive detection electrode, arranged on the first substrate and positioned proximal to one side of the second substrate; a second pressure-sensitive detection electrode, arranged on the second substrate and positioned proximal to one side of the first substrate, and a third pressure-sensitive detection element, positioned at one side of the first substrate distant from the second substrate and arranged at intervals from the first substrate. A first capacitance is formed between the second pressure-sensitive detection electrode and the first pressure-sensitive detection electrode. A second capacitance is formed between the third pressure-sensitive detection element and the first pressure-sensitive detection electrode. When the display panel is pressed, a magnitude of pressure is determined by detecting a variation of the first capacitance and a variation of the second capacitance.

15 Claims, 9 Drawing Sheets

(51) Int. Cl.
*G02F 1/1335* (2006.01)
*G02F 1/1339* (2006.01)
*G02F 1/1343* (2006.01)
*G06F 3/044* (2006.01)

(52) U.S. Cl.
CPC .... *G02F 1/13439* (2013.01); *G02F 1/133308* (2013.01); *G02F 1/133512* (2013.01); *G02F 1/134309* (2013.01); *G06F 3/044* (2013.01); *G06F 3/0412* (2013.01); *G06F 2203/04105* (2013.01)

(58) Field of Classification Search
CPC .. G02F 1/13439; G06F 3/0416; G06F 3/0412; G06F 3/044
See application file for complete search history.

(56) References Cited

U.S. PATENT DOCUMENTS

2017/0068376 A1* 3/2017 Kim ................ G06F 3/0416
2017/0090674 A1* 3/2017 Meng ............... G02F 1/13338

\* cited by examiner

|  |  |  |  |  | A |  |  |  |
|---|---|---|---|---|---|---|---|---|

| 74 | 85 | 109 | 238 | 176 | 108 | 102 | 104 | 65 |
|---|---|---|---|---|---|---|---|---|
| -81 | -84 | -35 | 181 |  |  | 3 | -10 | 9 |
| -159 | -128 | -82 | -17 |  238  | | -68 | -2 | -109 |
| -51 | -69 | -3 | -158 | | | -1 | -75 | -98 |
| -33 | -61 | -83 | -74 | | | 55 | -88 | -72 |
| -106 | -153 | -78 | -35 | -50 | -72 | -39 | -11 | -38 |
| -72 | -56 | 29 | -58 | -96 | -51 | -89 | -152 | -107 |
| -38 | -47 | -72 | -32 | -177 | -153 | -201 | -99 | -110 |

FIG. 5

| 346 | 376 | 364 | 266 | 254 | 282 | 218 | 279 | 239 |
|---|---|---|---|---|---|---|---|---|
| 225 | 315 | 318 | 273 | | | 128 | 186 | 106 |
| 233 | 206 | 209 | 286 | 376 | | 190 | 257 | 182 |
| 175 | 228 | 223 | 152 | | | 138 | 222 | 181 |
| 188 | 92 | 66 | 125 | | | 184 | 159 | 136 |
| 67 | 21 | 82 | 115 | 185 | 66 | 98 | 65 | 53 |
| 104 | 17 | 54 | 76 | 118 | -17 | 92 | 185 | 1 |
| -45 | 64 | -41 | -5 | 44 | 36 | 39 | -13 | 37 |

FIG. 6

| 167 | 189 | 309 | 414 | 239 | 226 | 209 | 236 | 157 |
| 259 | 369 | 416 | 531 |  |  | 327 | 295 | 325 |
| 286 | 289 | 390 | 502 | 531 | | 324 | 286 | 270 |
| 257 | 302 | 269 | 252 |  |  | 307 | 232 | 249 |
| 172 | 298 | 232 | 157 |  |  | 259 | 210 | 213 |
| 122 | 182 | 179 | 188 | 180 | 152 | 177 | 221 | 120 |
| 111 | 117 | 86 | 109 | 27 | 61 | 37 | 97 | 55 |
| -54 | 34 | -48 | 30 | 48 | 24 | 32 | 22 | 68 |

DISPLAY PANEL AND DRIVE METHOD THEREOF AS WELL AS DISPLAY APPARATUS

CROSS-REFERENCE TO RELATED APPLICATIONS

This application is based upon and claims priority to Chinese Patent Application 201610654966.6, filed Aug. 11, 2016, the entire contents of which are incorporated herein by reference.

TECHNICAL FIELD

The present disclosure relates to the field of display technologies, and more particularly, to a display panel, a drive method of the display panel, and a display apparatus having the display panel.

BACKGROUND

Display panels of integrated touch components are used in many electronic devices for users to input. When a user uses, for example a finger, to touch a display panel, the display panel sends signals to the device. In many display panels used in various devices, capacitive pressure sensing technologies are employed to detect a magnitude of touch pressure.

Specifically, in the prior art, a display panel generally is provided with a first pressure-sensitive detection electrode on an array substrate and with a second pressure-sensitive detection electrode on a color film substrate. Pressure variation when being pressed by fingers is detected through detecting a variation of a liquid crystal cell gap formed between the array substrate and the color film substrate (namely, a variation of a capacitance formed between the first pressure-sensitive detection electrode and the second pressure-sensitive detection electrode). In timing sequence, each display cycle of the display panel includes a display time period, a touch-sensing time period and a pressure-sensitive detection time period.

However, to the existing display panel adopting the integrated touch technology (namely, a magnitude of pressure is determined by detecting a capacitance variation caused by a variation in a liquid crystal cell gap), when being pressed, the variation in the liquid crystal cell gap is smaller, which causes a nonideal effect in pressure-sensitive detection. Therefore, it is necessary to seek for other methods to increase the capacitance variation when being pressed.

SUMMARY

In allusion to the defect of the prior art, an objective of the present disclosure is to provide a display panel, which can effectively improve a performance in pressure-sensitive detection for the display panel.

According to an aspect of the present disclosure, there is provided a display panel, including: a first substrate; a second substrate, disposed opposite to the first substrate; a first pressure-sensitive detection electrode, arranged on the first substrate and positioned proximal one side of the second substrate; a second pressure-sensitive detection electrode, arranged on the second substrate and positioned proximal one side of the first substrate, where a first capacitance is formed between the second pressure-sensitive detection electrode and the first pressure-sensitive detection electrode; and a third pressure-sensitive detection element, positioned at one side of the first substrate distant from the second substrate and arranged at intervals from the first substrate, where a second capacitance is formed between the third pressure-sensitive detection element and the first pressure-sensitive detection electrode, and when the display panel is pressed, a magnitude of pressure is determined by detecting a variation of the first capacitance and a variation of the second capacitance.

According to another aspect of the present disclosure, there is further provided a display apparatus, where the liquid crystal display apparatus includes the liquid crystal display panel.

According to another aspect of the present disclosure, there is further provided a drive method of the display panel, each display cycle of the display panel includes at least one pressure-sensitive detection time period, and the drive method includes following steps: a variation of a first capacitance formed between the first pressure-sensitive detection electrode and the second pressure-sensitive detection electrode of the display panel and a variation of a second capacitance formed between the first pressure-sensitive detection electrode and the third pressure-sensitive detection element of the display panel are detected within the pressure-sensitive detection time period to determine a magnitude of pressure.

The display panel provided by the embodiments of the present disclosure determine a magnitude of pressure applied onto the display panel by detecting a variation of a first capacitance formed between the first pressure-sensitive detection electrode on a first substrate and the second pressure-sensitive detection electrode on a second substrate and a variation of a second capacitance formed between the first pressure-sensitive detection electrode and the third pressure-sensitive detection element (in the embodiments, the third pressure-sensitive detection element is a bottom wall of a frame assembly of the display panel). Since the first capacitance formed between the first pressure-sensitive detection electrode and the second pressure-sensitive detection electrode is connected in parallel with the second capacitance formed between the first pressure-sensitive detection electrode and the third pressure-sensitive detection element, a basic capacitance value is increased compared with the prior art. Further, when the display panel is pressed, under the action of equal pressure, the total capacitance variation is apparently increased (by more than 50% at least). Therefore, the performance in pressure-sensitive detection can be effectively improved for the display panel, and a problem that a semaphore detected by the display panel under a low pressure is smaller can be solved. Furthermore, a structure of the display panel also is combined with structural characteristics of an in-cell touch display panel. Thus, it is easier to implement multi-point pressure touch.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

By reading the detailed description of non-limiting embodiments with reference to the following accompanying drawings, other features, objectives and advantages of the present disclosure will become more apparent.

FIG. 5 is a signal diagram of a display panel in the prior art subjected to a pressing action with a mass of 1,000 grams;

FIG. 6 is a signal diagram of a display panel subjected to a pressing action of a mass of 500 grams according to the present disclosure;

DETAILED DESCRIPTION

Figure 1:
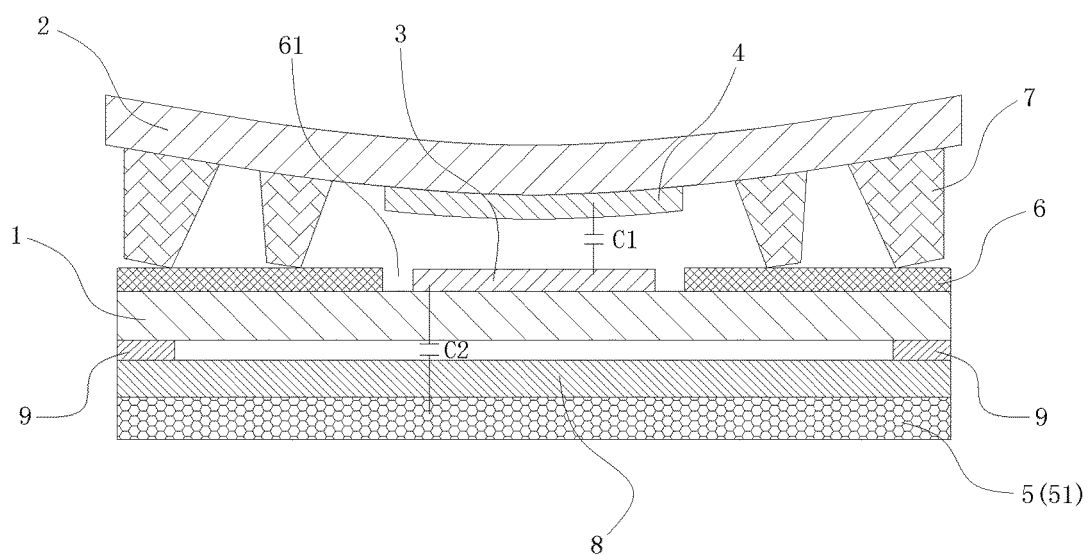
FIG. 1 is a schematic diagram of a sectional structure of a display panel according to the present disclosure.

Now, exemplary embodiments will be described more comprehensively with reference to the drawings. However, the exemplary embodiments may be carried out in various manners, and shall not be interpreted as being limited to the embodiments set forth herein; instead, providing these embodiments makes the present disclosure more comprehensive and complete, and thus fully conveys the concept underlying the exemplary embodiments to those skilled in the art. The same reference numerals in the drawings represent the same or similar structures, and thus repeated description thereof is omitted.

Characteristics, structures or features as described may be incorporated into one or more embodiments in any right way. Many concrete details are provided in the following descriptions for a full understanding of embodiments of the present disclosure. However, those skilled in the art shall realize that the technical solutions in the present disclosure may be practiced without one or more of the specific details, other methods, constituent elements, materials and the like. In some instances, well-known structures, materials or operations are not shown or described in detail to avoid obscuring the present disclosure.

Figure 2:
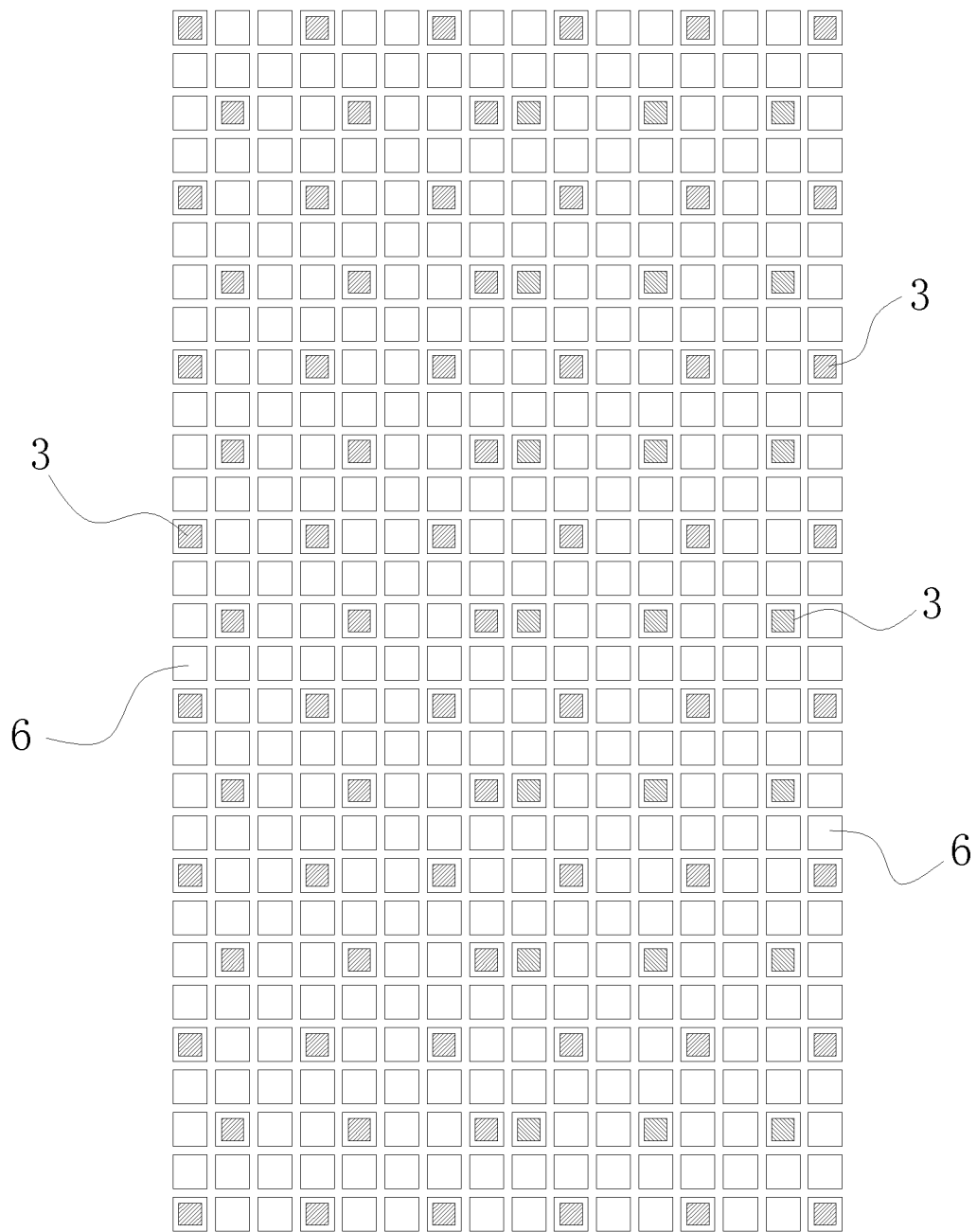
FIG. 2 is a vertical view of a first electrode on a first substrate of a display panel according to the present disclosure.
Figure 3:
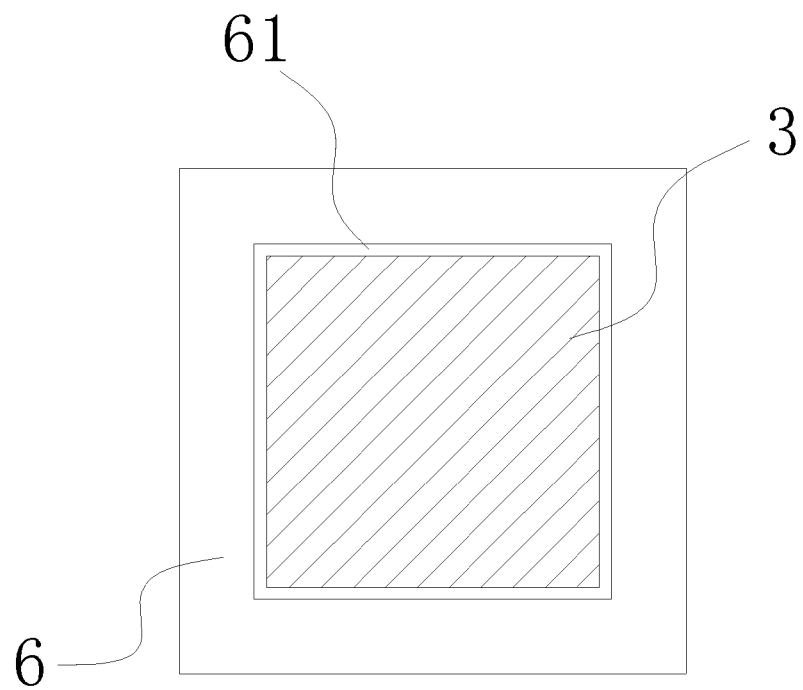
FIG. 3 is a schematic structural diagram of a first pressure-sensitive detection electrode of a display panel according to the present disclosure.

Referring to FIG. 1-FIG. 3, FIG. 1 illustrates a schematic diagram of a sectional structure of a display panel according to the present disclosure; FIG. 2 illustrates a vertical view of a first electrode on a first substrate of a display panel according to the present disclosure; and FIG. 3 illustrates a schematic structural diagram of a first pressure-sensitive detection electrode of a display panel according to the present disclosure. As shown in FIG. 1-FIG. 3, in alternative embodiments of the present disclosure, the display panel may be a liquid crystal display panel or an OLED display panel. The display panel includes: a first substrate 1, a second substrate 2, a first pressure-sensitive detection electrode 3, a second pressure-sensitive detection electrode 4 and a third pressure-sensitive detection element 5.

Optionally, the first substrate 1 may be an array substrate. The second substrate 2 is arranged opposite to the first substrate 1. In the embodiment as shown in FIG. 1, the second substrate 2 is arranged opposite to and above the first substrate 1.

The first pressure-sensitive detection electrode 3 is arranged on the first substrate 1 and positioned proximal to one side of the second substrate 2. Specifically, in the embodiments as shown in FIG. 1-FIG. 3, the display panel includes a plurality of first electrodes 6. The first electrodes 6 are configured to provide touch sensing signals within the touch-sensing time period of the display panel. As shown in FIG. 1, at least some of the first electrodes 6 include a hollow part 61. In FIG. 1 and FIG. 3, reference is made by taking one first electrode 6 having the hollow part 61 as an example. As shown in FIG. 1 and FIG. 3, the first pressure-sensitive detection electrode 3 is arranged in the hollow part 61 of the first electrode 6 and is surrounded by the first electrode 6. It is to be noted that in other embodiments of the present disclosure, the first pressure-sensitive detection electrode 3 may also be not arranged in the hollow part. For example, the first pressure-sensitive detection electrode 3 may form a concave part, in which the first pressure-sensitive detection electrode is arranged. These embodiments may achieve a similar effect, which is not described herein again.

The second pressure-sensitive detection electrode 4 is arranged on the second substrate 2 and positioned proximal to one side of the first substrate 1, where a first capacitance C1 is formed between the second pressure-sensitive detection electrode 4 and the first pressure-sensitive detection electrode 3. It is to be noted that, the second pressure-sensitive detection electrode 4 is positioned proximal to one side of the first substrate 1, not limited to being directly arranged on the lower surface of the second substrate 2 as shown in FIG. 1, also including being arranged at intervals from the second substrate 2 proximal to one side of the first substrate 1, namely, other elements may be provided between the second pressure-sensitive detection electrode 4 and the second substrate 2, which is not described herein again.

In the embodiments as shown in FIG. 1-FIG. 3, positions and quantities of the second pressure-sensitive detection electrodes 4 are corresponding to those of the first pressure-sensitive detection electrodes 3 on the first substrate 1. A projection of each of the second pressure-sensitive detection electrodes 4 on the first substrate 1 at least covers one of the first pressure-sensitive detection electrodes 3. In alternative embodiments as shown in FIG. 1, each of the second pressure-sensitive detection electrodes 4 is roughly shaped like a rectangle. The projection of each of the second pressure-sensitive detection electrodes 4 on the first substrate 1 is larger than one of the first pressure-sensitive detection electrodes 3. Thus, signal loss of the first pressure-sensitive detection electrodes 3 may be avoided.

Further, the display panel further includes a plurality of spacers 7. The spacers 7 are arranged between the first substrate 1 and the second substrate 2. Each of the second pressure-sensitive detection electrodes 4 is positioned among a plurality of the spacers 7.

The third pressure-sensitive detection element 5 is positioned at one side of the first substrate 1 distant from the second substrate 2 and is arranged at intervals from the first substrate 1 (namely, not in direct contact with the surface of the first substrate 1, a gap or other element existing between the third pressure-sensitive detection element 5 and the first substrate 1), where a second capacitance C2 is formed between the third pressure-sensitive detection element 5 and the first pressure-sensitive detection electrode 3. Specifically, in the embodiment as shown in FIG. 1, the display panel further includes a frame assembly and a backlight module 8.

The frame assembly includes a bottom wall 51 and side walls (not shown in FIG. 1) connected with the bottom wall 51 to form an accommodating space. The backlight module 8 is arranged in the accommodating space of the frame assembly, positioned at one side of the first substrate 1 distant from the second substrate 2 and arranged at intervals from the first substrate 1 (namely, not in direct contact with the surface of the first substrate 1, a gap or other element existing between the backlight module 8 and the first substrate 1). The bottom wall 51 is positioned at one side of the backlight module 8 distant from the first substrate 1, namely, as shown in FIG. 1, the backlight module 8 is placed on the bottom wall 51. In this embodiment, the bottom wall 51 is further used as the third pressure-sensitive detection element 5, in other words, the bottom wall 51 is the third pressure-sensitive detection element 5. Further, when the display panel is pressed, a magnitude of pressure is determined by detecting a variation of the first capacitance C1 formed between the first pressure-sensitive detection electrode 3 and the second pressure-sensitive detection electrode 4 and a variation of the second capacitance C2 formed between the first pressure-sensitive detection electrode 3 and the bottom wall 51 serving as the third pressure-sensitive detection element 5.

It is to be noted that in other embodiments in accordance with the present disclosure, the third pressure-sensitive detection element 5 also may be an individual electrode, which may be arranged between the backlight module 8 and the bottom wall 51 as shown in FIG. 1, or may be arranged in the OLED display panel. Since it is not provided with a backlight module, an electrode serving as the third pressure-sensitive detection element also may be directly arranged on the surface (namely, the lower surface in FIG. 1) at one side of the first substrate distant from the second substrate, which is not described herein again.

Further, in the embodiment as shown in FIG. 1, the display panel further includes a light shielding layer 9 positioned between the first substrate 1 and the backlight module 8 and form a gap therebetween. In an embodiment, the light shielding layer 9 is used for attaching the backlight module 8 and the first substrate 1, so as to prevent the backlight module 8 from leaking light.

Figure 4:
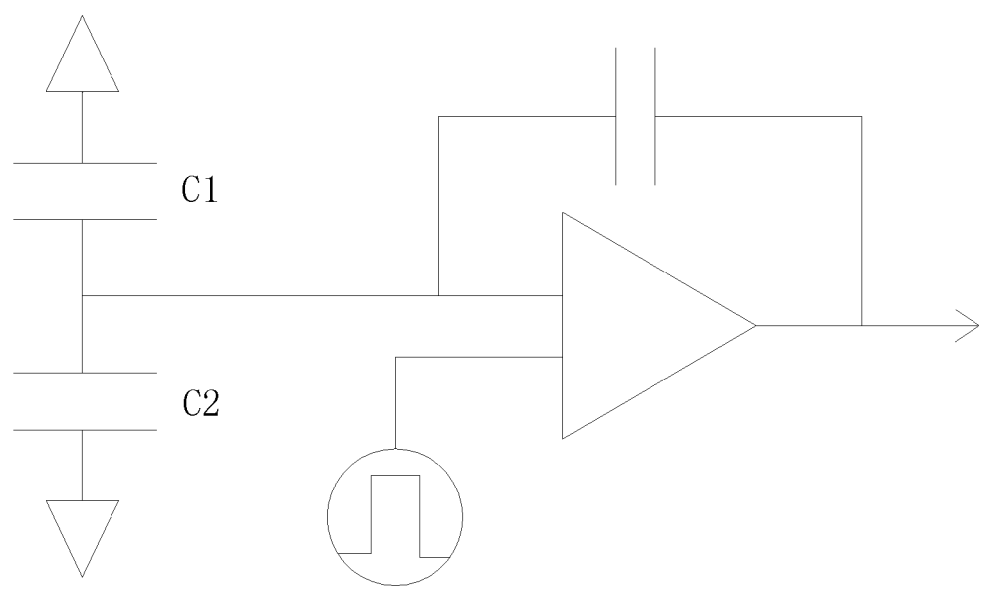
FIG. 4 is an equivalent circuit diagram formed between the first pressure-sensitive detection electrode and the second pressure-sensitive detection electrode and the third pressure-sensitive detection element of a display panel according to the present disclosure.

Further, referring to FIG. 4, it illustrates an equivalent circuit diagram formed between the first pressure-sensitive detection electrode and the second pressure-sensitive detection electrode and the third pressure-sensitive detection element of a display panel according to the present disclosure. Specifically, since the first capacitance C1 formed between the first pressure-sensitive detection electrode 3 and the second pressure-sensitive detection electrode 4 in FIG. 1 is connected in parallel with the second capacitance C2 formed between the first pressure-sensitive detection electrode 3 and the bottom wall 51 serving as the third pressure-sensitive detection element 5, a total capacitance to earth formed by both is a sum of C1 and C2, namely, a basic capacitance value is increased compared with the prior art. Further, when the display panel is pressed, under the action of equal pressure, the total capacitance variation is apparently increased (by more than 50% at least). Therefore, the performance in pressure-sensitive detection can be effectively improved for the display panel.

Figures 7, 8:
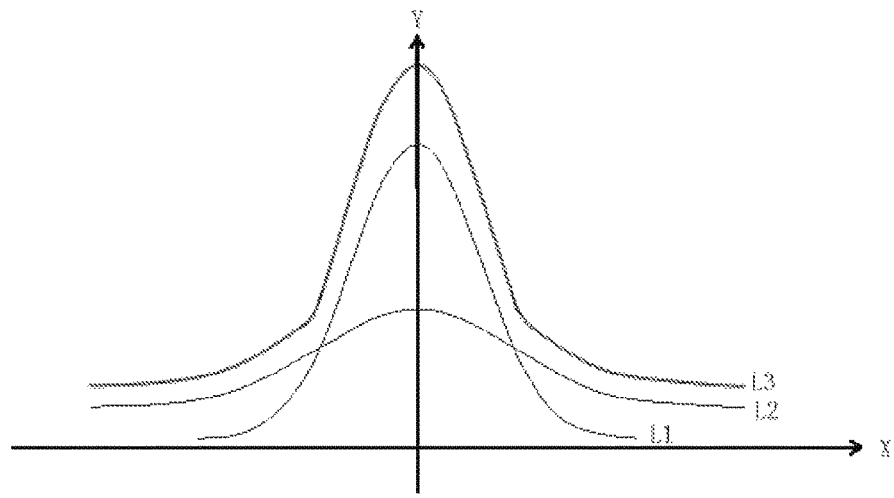
FIG. 7 is a signal diagram of a display panel subjected to a pressing action of a mass of 1,000 grams according to the present disclosure.
FIG. 8 is a curve chart of distribution of semaphore with space for the display panel according to the present disclosure and an existing display panel under equal pressure.

Further, FIG. 5 illustrates a signal diagram of a display panel in the prior art subjected to a pressing action with a mass of 1,000 grams. FIG. 6 and FIG. 7 respectively illustrate a signal diagram of the display panel subjected to a pressing action with a mass of 500 grams and a mass of 1,000 grams according to the present disclosure. As shown in FIG. 5-FIG. 8, at the same pressed area A, semaphore of the display panel in the prior art at the pressed area A is merely 238 (as shown in FIG. 5). However, under the action of equal pressure (1,000 grams), semaphore of the display panel in the present disclosure at the pressed area A is 531 (as shown in FIG. 7). Even though only half of the pressure is applied, the semaphore of the display panel in the present disclosure at the pressed area A is 376 (as shown in FIG. 6), which is greater than the semaphore in the prior art. Referring to FIG. 8, it illustrates a curve chart of distribution of semaphore with space for the display panel according to the present disclosure and an existing display panel under equal pressure; As shown in FIG. 8, an X-axis is space distribution on the display panel, a Y-axis is detected semaphore on the display panel. L1 is a curve of an existing display panel having no third pressure-sensitive detection element subjected to pressure; L2 is a curve of an existing display panel having no second pressure-sensitive detection electrode subjected to pressure; and L3 is a curve of the display panel in the present disclosure (namely, in combination with the first pressure-sensitive detection electrode, the second pressure-sensitive detection electrode and the third pressure-sensitive detection element) subjected to pressure. L1, L2 and L3 are curves formed under the action with a mass of 1,000 grams. As can be seen from FIG. 5-FIG. 8, the performance in pressure-sensitive detection is significantly improved for the display panel in the present disclosure, and a problem that a semaphore detected by the display panel under a low pressure is smaller can be solved.

Further, the present disclosure also provides a display apparatus, where the liquid crystal display apparatus includes the liquid crystal display panel as shown in FIG. 1-FIG. 3. Since the display panel is used in the display apparatus, the performance in pressure-sensitive detection can also be significantly improved for the display apparatus, which is not described herein again.

Further, the present disclosure also provides a drive method of the display panel as shown in FIG. 1-FIG. 3. Specifically, each display cycle of the display panel includes at least one pressure-sensitive detection time period, where within the pressure-sensitive detection time period, the variation of the first capacitance formed between the first pressure-sensitive detection electrode and the second pressure-sensitive detection electrode of the display panel and the variation of the second capacitance formed between the first pressure-sensitive detection electrode and the third pressure-sensitive detection element of the display panel are detected to determine a magnitude of pressure.

Figure 9:
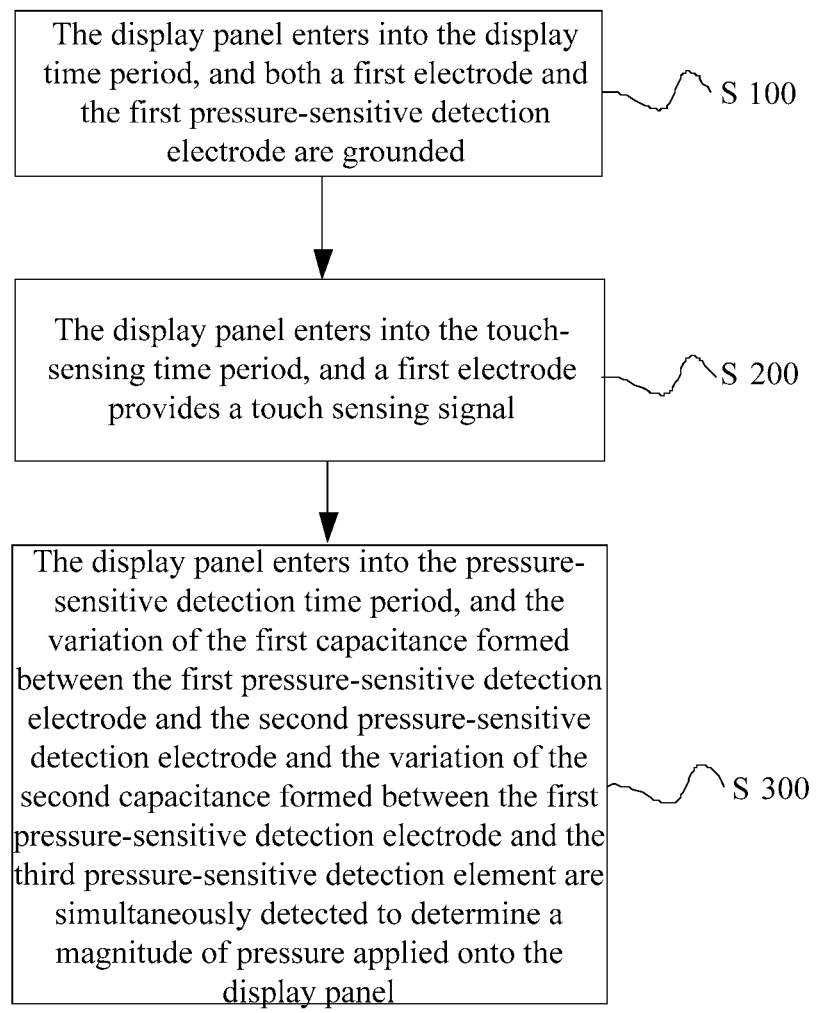
FIG. 9 is a flowchart of a drive method of the display panel according to the present disclosure.

Specifically, referring to FIG. 9, it illustrates a flowchart of the drive method of the display panel according to the present disclosure. In the embodiment as shown in FIG. 9, each display cycle of the display panel further includes at least one touch-sensing time period and one display time period. Namely, each display cycle of the display panel includes a display time period, a touch-sensing time period and a pressure-sensitive detection time period. The drive method includes following steps.

Step S100: the display panel enters into the display time period, and both a first electrode and the first pressure-sensitive detection electrode may be grounded.

Step S200: the display panel enters into the touch-sensing time period, and a first electrode of the display panel provides a touch sensing signal within the touch-sensing time period to implement a touch sensing function of the display panel.

Step S300: the display panel enters into the pressure-sensitive detection time period, and the variation of the first capacitance formed between the first pressure-sensitive detection electrode and the second pressure-sensitive detection electrode of the display panel and the variation of the second capacitance formed between the first pressure-sensitive detection electrode and the third pressure-sensitive detection element of the display panel are simultaneously detected within the pressure-sensitive detection time period to determine a magnitude of pressure applied onto the display panel so as to implement a pressure-sensitive detection function of the display panel.

It is to be noted that in other embodiments in accordance with the present disclosure, within the pressure-sensitive detection time period, the variation of the first capacitance formed between the first pressure-sensitive detection electrode and the second pressure-sensitive detection electrode of the display panel is detected first, and then the variation of the second capacitance formed between the first pressure-sensitive detection electrode and the third pressure-sensitive detection element of the display panel is detected. Alternatively, after the variation of the second capacitance formed between the first pressure-sensitive detection electrode and the third pressure-sensitive detection element of the display panel is detected, the variation of the first capacitance formed between the first pressure-sensitive detection electrode and the second pressure-sensitive detection electrode of the display panel is detected. These embodiments may implement an effect similar to the embodiment, which is not described herein again.

Reference is made in FIG. 9 by taking an example in which the display panel merely in sequence goes through one display time period, one touch-sensing time period and one pressure-sensitive detection time period. However, according to demands of the display panel, in other embodiments of the present disclosure, settings of various time periods in each display cycle may be different. For example, one display cycle may include a plurality of display time periods, touch-sensing time periods and pressure-sensitive detection time periods, and the display time periods, the touch-sensing time periods and the pressure-sensitive detection time periods may alternate with each other, which is not described herein again.

As can be seen above, the display panel of the present disclosure determines a magnitude of pressure applied onto the display panel by detecting the variation of the first capacitance formed between the first pressure-sensitive detection electrode on a first substrate and the second pressure-sensitive detection electrode on a second substrate and the variation of the second capacitance formed between the first pressure-sensitive detection electrode and the third pressure-sensitive detection element (in this embodiment, the third pressure-sensitive detection element is the bottom wall of the frame assembly of the display panel). Since the first capacitance formed between the first pressure-sensitive detection electrode and the second pressure-sensitive detection electrode is connected in parallel with the second capacitance formed between the first pressure-sensitive detection electrode and the third pressure-sensitive detection element, a basic capacitance value is increased compared with the prior art. Further, when the display panel is pressed, under the action of equal pressure, the total capacitance variation is apparently increased (by more than 50% at least). Therefore, the performance in pressure-sensitive detection can be effectively improved for the display panel, and a problem that a semaphore detected by the display panel under a low pressure is smaller can be solved. Furthermore, a structure of the display panel also is combined with structural characteristics of an in-cell touch display panel. Thus, it is easier to implement multi-point pressure touch.

Figure 10:
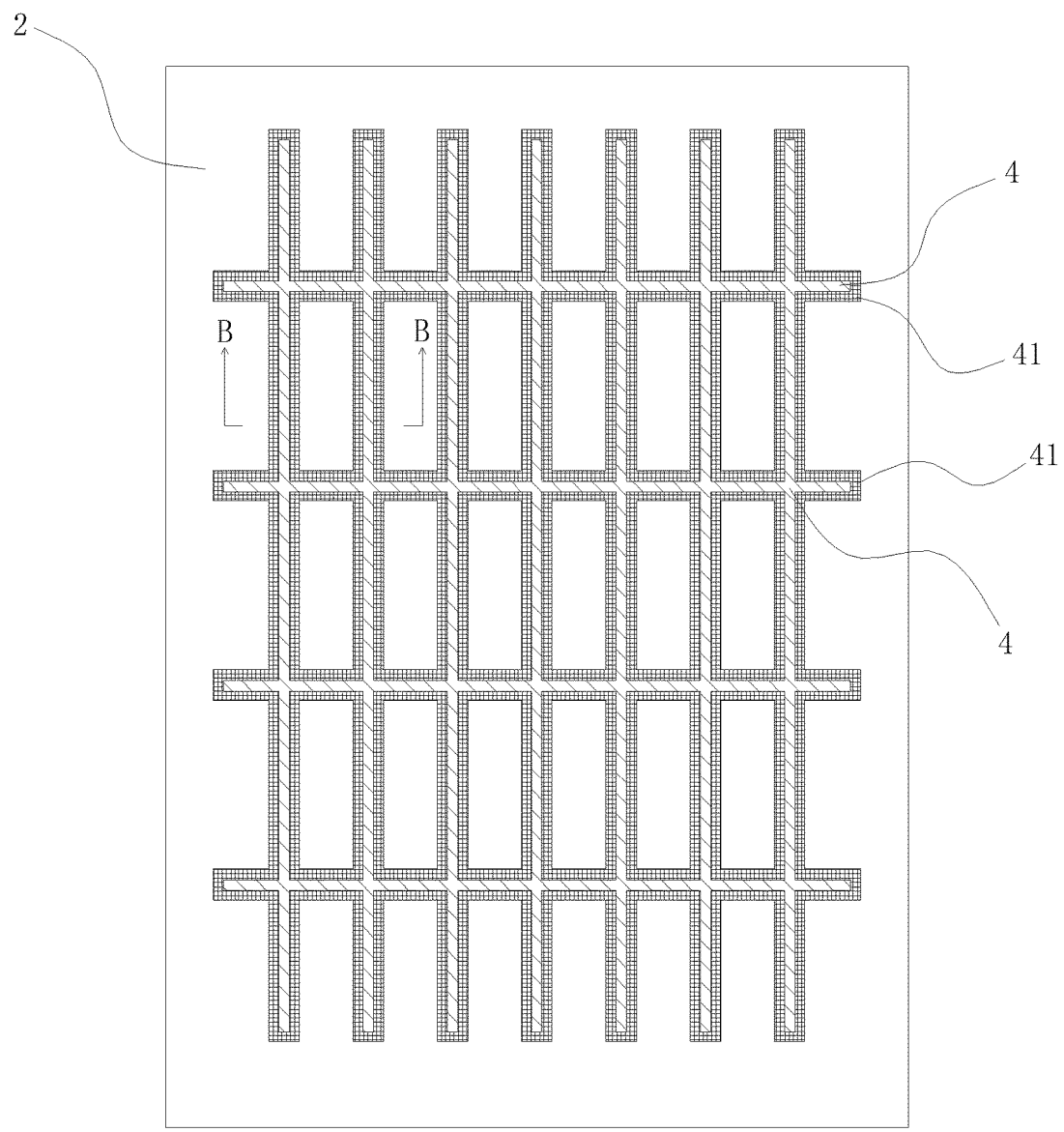
FIG. 10 is a schematic structural diagram of a second pressure-sensitive detection electrode of a display panel according to the present disclosure.
Figure 11:
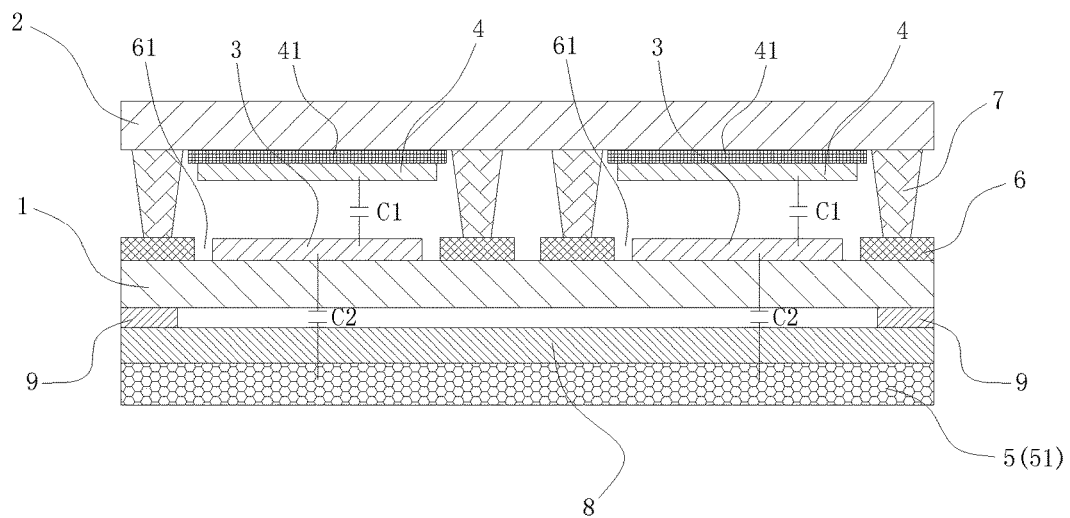
FIG. 11 is a schematic diagram of a sectional structure of a display panel according to the present disclosure.

FIG. 10 and FIG. 11 are another embodiments of the display panel in accordance with the present disclosure. Referring to FIG. 10 and FIG. 11, they respectively illustrate a schematic structural diagram of a second pressure-sensitive detection electrode of a display panel and a schematic diagram of a sectional structure of the display panel according to the present disclosure. FIG. 11 is a schematic diagram of a sectional structure along B-B in FIG. 10. Different from the display panel as shown in FIG. 1-FIG. 3, in this embodiment, the second pressure-sensitive detection electrode 4 is grid-shaped. Specifically, the display panel further includes a black matrix 41. As shown in FIG. 10 and FIG. 11, the black matrix 41 is arranged between the second pressure-sensitive detection electrode 4 and the second substrate 2. FIG. 10 may be regarded as a projection of the black matrix 41 and the second pressure-sensitive detection electrode 4 on the second substrate 2. As shown in FIG. 10, the projection of the black matrix 41 on the second substrate 2 at least covers the projection of the grid-shaped second pressure-sensitive detection electrode 4 on the second substrate 2. Thus, the second pressure-sensitive detection electrode 4 may be avoided from having a negative effect on display of a display area of the display panel.

In this embodiment, the second pressure-sensitive detection electrode 4 still corresponds to a plurality of first pressure-sensitive detection electrodes on the first substrate 1, thereby forming the first capacitance C1 to implement an effect similar to the display panel as shown in FIG. 1-FIG. 3. Compared with structures of a plurality of electrodes corresponding to the first pressure-sensitive detection electrode formed in the display panel as shown in FIG. 1-FIG. 3, the structure of the second pressure-sensitive detection electrode 4 is more convenient in a manufacturing process, which is not described herein again.

Figure 12:
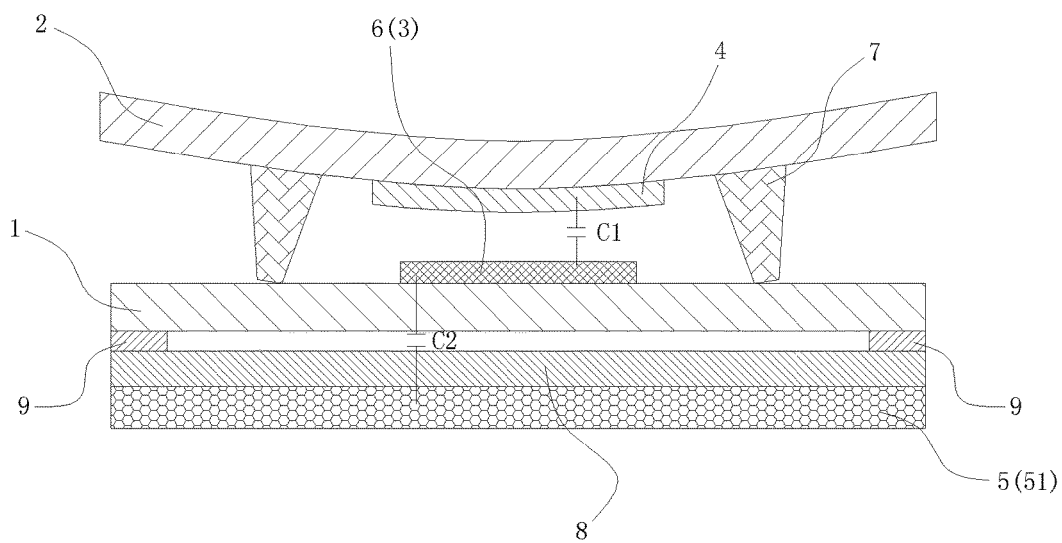
FIG. 12 is a schematic diagram of a sectional structure of a display panel according to the present disclosure.
Figure 13:
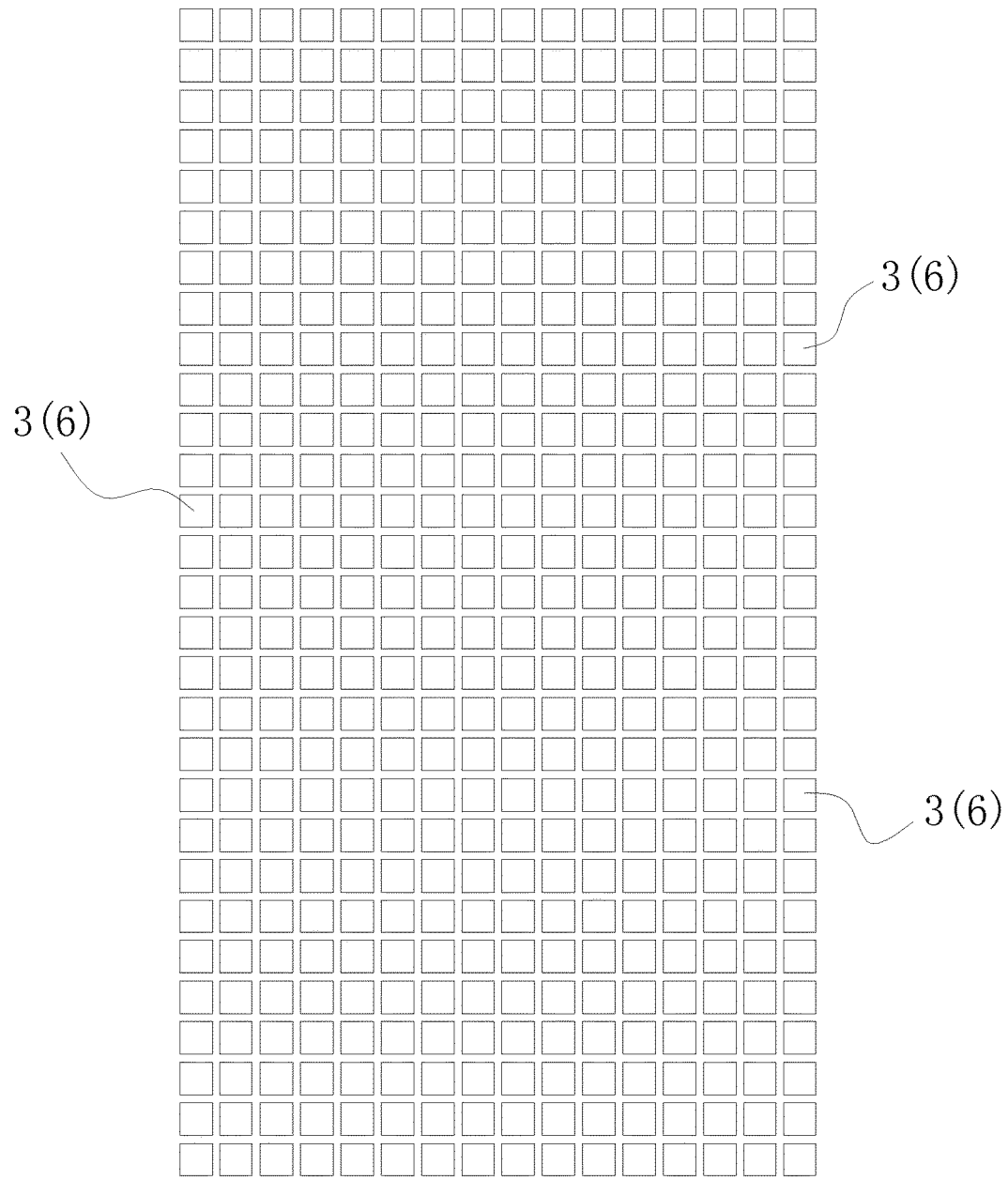
FIG. 13 is a vertical view of a first electrode on a first substrate of a display panel according to the present disclosure.

FIG. 12 and FIG. 13 are another embodiments of the touch display panel in accordance with the present disclosure, referring to FIG. 12 and FIG. 13, they illustrate a schematic diagram of a sectional structure of a display panel according to the present disclosure and a vertical view of a first electrode on the first substrate of the display panel. Different from the display panel as shown in FIG. 1-FIG. 3, in this embodiment, at least some of first electrodes 6 on the first substrate 1 are time-divisionally multiplexed as a touch electrode and a first pressure-sensitive detection electrode. Specifically, in this embodiment, it is unnecessary to extra form hollow parts on the first electrodes 6. As shown in FIG. 13, when the display panel is in the touch-sensing time period, some of the first electrodes 6 are configured to serve as touch electrodes. Whereas when the display panel is in the pressure-sensitive detection time, some of the first electrodes 6 are configured to serve as the first pressure-sensitive detection electrodes 3. In FIG. 12, one time-divisionally multiplexed first electrode is taken as an example, as shown in FIG. 12, when the display panel is in the pressure-sensitive detection time, the first electrodes 6 are the first pressure-sensitive detection electrodes 3. This embodiment may also implement an effect similar to the display panel as shown in FIG. 1-FIG. 3, and it is unnecessary to extra form hollow parts or individually manufacture first pressure-sensitive detection electrodes used for pressure-sensitive detection in the hollow parts. Therefore, the process for manufacturing the display panel in this embodiment is more convenient, which is not described herein again.

In conclusion, the display panel provided by the embodiments in accordance with the present disclosure determine a magnitude of pressure applied onto the display panel by detecting a variation of a first capacitance formed between the first pressure-sensitive detection electrode on a first substrate and the second pressure-sensitive detection electrode on a second substrate and a variation of a second capacitance formed between the first pressure-sensitive detection electrode and the third pressure-sensitive detection element (in the embodiments, the third pressure-sensitive detection element is a bottom wall of a frame assembly of the display panel). Since the first capacitance formed between the first pressure-sensitive detection electrode and the second pressure-sensitive detection electrode is connected in parallel with the second capacitance formed between the first pressure-sensitive detection electrode and the third pressure-sensitive detection element, a basic capacitance value is increased compared with the prior art. Further, when the display panel is pressed, under the action of equal pressure, the total capacitance variation is apparently increased (by more than 50% at least). Therefore, the performance in pressure-sensitive detection can be effectively improved for the display panel, and a problem that a semaphore detected by the display panel under a low pressure is smaller can be solved. Furthermore, a structure of the display panel also is combined with structural characteristics of an in-cell touch display panel. Thus, it is easier to implement multi-point pressure touch.

Although the present disclosure is disclosed with the above alternative embodiments, these alternative embodiments are not intended to limit the present disclosure. Those skilled in the art may make various alterations and modifications without departing from the spirit and scope of the present disclosure.

What is claimed is:

1. A display panel, comprising:
a first substrate;
a second substrate disposed opposite to the first substrate;
a first pressure-sensitive detection electrode, arranged on the first substrate and positioned proximal to one side of the second substrate;
a second pressure-sensitive detection electrode, arranged on the second substrate and positioned proximal to one side of the first substrate, wherein a first capacitance is formed between the second pressure-sensitive detection electrode and the first pressure-sensitive detection electrode; and
a third pressure-sensitive detection element, positioned at one side of the first substrate distant from the second substrate and arranged at intervals from the first substrate, wherein a second capacitance is formed between the third pressure-sensitive detection element and the first pressure-sensitive detection electrode; and,
wherein when the display panel is pressed, both the first capacitance and the second capacitance are varied as a function of a magnitude of pressure, and the magnitude of pressure is determined by detecting a variation of the first capacitance and a variation of the second capacitance.

2. The display panel according to claim 1, wherein the display panel comprises a plurality of first electrodes, at least some of the first electrodes comprise a hollow part, and the first pressure-sensitive detection electrode is arranged in the hollow part.

3. The display panel according to claim 1, wherein the display panel comprises a plurality of first electrodes, at least some of the first electrodes are time-divisionally multiplexed as a touch electrode and a first pressure-sensitive detection electrode.

4. The display panel according to claim 1, wherein a projection of the second pressure-sensitive detection electrode on the first substrate at least covers the first pressure-sensitive detection electrode.

5. The display panel according to claim 1, wherein the display panel further comprises a plurality of spacers arranged between the first substrate and the second substrate, and the second pressure-sensitive detection electrode is positioned among a plurality of the spacers.

6. The display panel according to claim 1, wherein the second pressure-sensitive detection electrode is grid-shaped.

7. The display panel according to claim 6, wherein the display panel further comprises a black matrix, a projection of the black matrix on the second substrate at least covers a projection of the grid-shaped second pressure-sensitive detection electrode on the second substrate.

8. The display panel according to claim 1, wherein the display panel further comprises a frame assembly comprising a bottom wall and side walls connected with the bottom wall to form an accommodating space, wherein the bottom wall is further used as the third pressure-sensitive detection element.

9. The display panel according to claim 8, wherein the display panel further comprises a backlight module arranged in the accommodating space, positioned at one side of the first substrate distant from the second substrate and arranged at intervals from the first substrate, wherein the bottom wall is positioned at one side of the backlight module distant from the first substrate.

10. A display apparatus, comprising a liquid crystal display panel, wherein the liquid crystal display panel comprises:
a first substrate;
a second substrate disposed opposite to the first substrate;
a first pressure-sensitive detection electrode, arranged on the first substrate and positioned proximal to one side of the second substrate;
a second pressure-sensitive detection electrode, arranged on the second substrate and positioned proximal to one side of the first substrate, wherein a first capacitance is formed between the second pressure-sensitive detection electrode and the first pressure-sensitive detection electrode; and
a third pressure-sensitive detection element, positioned at one side of the first substrate distant from the second substrate and arranged at intervals from the first substrate, wherein a second capacitance is formed between the third pressure-sensitive detection element and the first pressure-sensitive detection electrode; and, wherein when the display panel is pressed, both the first capacitance and the second capacitance are varied as a function of a magnitude of pressure, and the magnitude of pressure is determined by detecting a variation of the first capacitance and a variation of the second capacitance.

11. A method for driving the display panel according to claim 1, comprising:

detecting a variation of the first capacitance formed between the first pressure-sensitive detection electrode and the second pressure-sensitive detection electrode of the display panel and a variation of the second capacitance formed between the first pressure-sensitive detection electrode and the third pressure-sensitive detection element of the display panel within a pressure-sensitive detection time period in each display cycle of the display panel to determine the magnitude of pressure.

12. The drive method of the display panel according to claim 11, wherein within the pressure-sensitive detection time period, the variation of the first capacitance formed between the first pressure-sensitive detection electrode and the second pressure-sensitive detection electrode of the display panel is detected first, and then the variation of the second capacitance formed between the first pressure-sensitive detection electrode and the third pressure-sensitive detection element of the display panel is detected.

13. The drive method of the display panel according to claim 11, wherein within the pressure-sensitive detection time period, the variation of the second capacitance formed between the first pressure-sensitive detection electrode and the third pressure-sensitive detection element of the display panel is detected first, and then the variation of the first capacitance formed between the first pressure-sensitive detection electrode and the second pressure-sensitive detection electrode of the display panel is detected.

14. The drive method of the display panel according to claim 11, wherein within the pressure-sensitive detection time period, the variation of the first capacitance formed between the first pressure-sensitive detection electrode and the second pressure-sensitive detection electrode of the display panel and the variation of the second capacitance formed between the first pressure-sensitive detection electrode and the third pressure-sensitive detection element of the display panel are detected simultaneously.

15. The drive method of the display panel according to claim 11, wherein each display cycle of the display panel further comprises at least one touch-sensing time period, within the touch-sensing time period, a first electrode of the display panel provides a touch sensing signal.

* * * * *